US008780903B2

(12) United States Patent
Hwang et al.

(10) Patent No.: US 8,780,903 B2
(45) Date of Patent: Jul. 15, 2014

(54) APPARATUS AND METHOD FOR SUPPORTING VARIABLE LENGTH OF TRANSPORT PACKET IN AN AUDIO AND VIDEO COMMUNICATION SYSTEM

(75) Inventors: Sung-Hee Hwang, Gyeonggi-do (KR); Hak-Ju Lee, Incheon (KR); Se-Ho Myung, Gyeonggi-do (KR); Jin-Hee Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 245 days.

(21) Appl. No.: 13/311,165

(22) Filed: Dec. 5, 2011

(65) Prior Publication Data

US 2012/0140769 A1 Jun. 7, 2012

(30) Foreign Application Priority Data

Dec. 3, 2010 (KR) ........................ 10-2010-0122428

(51) Int. Cl.
*H04L 12/28* (2006.01)
*H04J 1/16* (2006.01)
*H04J 3/24* (2006.01)
*H04N 5/94* (2006.01)
*H04N 7/16* (2011.01)
*H04N 7/20* (2006.01)
*H04L 29/06* (2006.01)
*H04N 21/2389* (2011.01)
*H04N 21/236* (2011.01)
*H04L 12/56* (2006.01)
*H04L 7/10* (2006.01)

(52) U.S. Cl.
CPC .............. *H04L 65/602* (2013.01); *H04L 7/10* (2013.01); *H04L 69/22* (2013.01); *H04N 21/2389* (2013.01); *H04N 21/236* (2013.01); *H04L 45/00* (2013.01); *H04L 65/608* (2013.01); *H04N 21/23605* (2013.01); *H04L 65/607* (2013.01)
USPC ........... 370/389; 370/252; 370/474; 386/273; 725/62; 725/67

(58) Field of Classification Search
USPC ................ 370/252, 474; 386/273; 725/62, 67
See application file for complete search history.

(56) References Cited

U.S. PATENT DOCUMENTS

| | | | | |
|---|---|---|---|---|
| 5,771,239 A | * | 6/1998 | Moroney et al. | 370/474 |
| 6,115,531 A | * | 9/2000 | Yanagihara | 386/273 |
| 2006/0209709 A1 | * | 9/2006 | Kovacevic | 370/252 |
| 2009/0007190 A1 | * | 1/2009 | Weber et al. | 725/67 |
| 2009/0013356 A1 | * | 1/2009 | Doerr et al. | 725/62 |

FOREIGN PATENT DOCUMENTS

| | | |
|---|---|---|
| EP | 1 035 735 | 9/2000 |
| KR | 1020060022696 | 3/2006 |
| KR | 1020090112684 | 10/2009 |
| WO | WO 03/010975 | 2/2003 |
| WO | WO 2007/050065 | 5/2007 |

* cited by examiner

*Primary Examiner* — Jung Park
*Assistant Examiner* — Chuong M Nguyen
(74) *Attorney, Agent, or Firm* — The Farrell Law Firm, P.C.

(57) ABSTRACT

Methods and apparatus are provided for supporting a variable-length transport packet in a audio and video communication system. Data to be transmitted through a transport packet is determined. A header of the transport packet is generated. The header includes a start sync signal. When a length of the transport packet exceeds a reference size, at least one intermediate sync signal is inserted into the transport packet according to a pre-defined interval. The transport packet is transmitted.

34 Claims, 9 Drawing Sheets

APPARATUS AND METHOD FOR SUPPORTING VARIABLE LENGTH OF TRANSPORT PACKET IN AN AUDIO AND VIDEO COMMUNICATION SYSTEM

PRIORITY

The present application claims priority under 35. U.S.C. §119(a) to a Korean patent application, which was filed in the Korean Intellectual Property Office on Dec. 3, 2010,. and was assigned Serial No. 10-2010-0122428,. the content of which is incorporated herein by reference.

BACKGROUND OF THE INVENTION

1.. Field of the Invention

The present invention relates generally to an audio and video communication system, and more particularly, to a method for supporting a variable-length transport packet in the audio and video communication system.

2.. Description of the Related Art

A Moving Picture Experts Group 2-Transport Stream (MPEG2-TS) packet, which is defined for audio and video broadcast data, has a fixed length of 188. bytes, including a 4-byte header and a 184-byte adaptation field/payload. However, with the introduction of high-density contents such as 3. Dimensional (3D), Ultra Definition (UD)-grade contents, audio and broadcast communication requires higher-rate data transmission.

However, the 4-byte header information for each 184-byte payload in a current MPEG TS packet is inefficient for higher rate data transmission. Specifically, when it is necessary to transmit data having a size that is less than 184. bytes, data transmission efficiency further decreases.

SUMMARY OF THE INVENTION

The present invention has been made to address at least the above problems and/or disadvantages and to provide at least the advantages described below. Accordingly, an aspect of the present invention provides an apparatus and method for supporting a variable-length packet in a audio and video communication system.

Another aspect of the present invention provides an apparatus and method for obtaining a synchronization of a variable-length packet in a audio and video communication system.

A further aspect of the present invention provides an apparatus and method for inserting a sync signal into a variable-length packet in a audio and video communication system.

In accordance with an aspect of the present invention, a method of operating a transmitting end in a communication system is provided. Data to be transmitted through a transport packet is determined. A header of the transport packet is generated. The header includes a start sync signal. When a length of the transport packet exceeds a reference size, at least one intermediate sync signal is inserted into the transport packet according to a pre-defined interval between sync signals. The transport packet is transmitted.

In accordance with another aspect of the present invention, a method of operating a receiving end in a communication system is provided. A synchronization of a transport packet is obtained by detecting a start sync signal included in a header of the transport packet and at least one intermediate sync signal arranged in the transport packet according to a pre-defined interval between synch signals. A stream is extracted from the transport packet. The stream is processed.

In accordance with another aspect of the present invention, a transmitting-end apparatus in a communication system is provided. The apparatus includes a Multiplexer (MUX) for determining data to be transmitted through a transport packet, generating a header of the transport packet, where the header includes a start sync signal, and inserting at least one intermediate sync signal into the transport packet according to a pre-defined interval between sync signals, when a length of the transport packet exceeds a reference size. The apparatus also includes a transmitter for transmitting the transport packet.

In accordance with another aspect of the present invention, a receiving-end apparatus in a communication system is provided. The apparatus includes a De-multiplexer (DEMUX) for obtaining a synchronization of a transport packet by detecting a start sync signal included in a header of the transport packet and at least one intermediate sync signal arranged in the transport packet according to a pre-defined interval between sync signals, and extracting a stream from the transport packet. The apparatus also includes a decoder for processing the stream.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
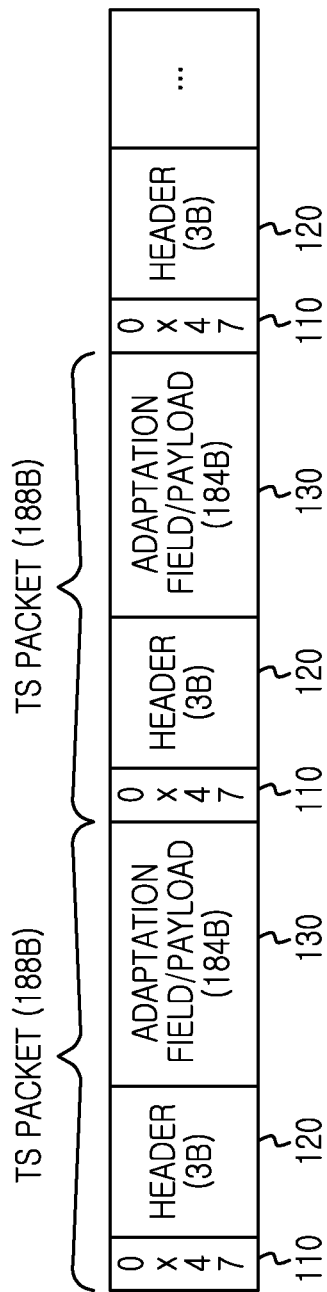
FIG. 1 is a diagram illustrating a structure of a transport packet conforming to the conventional Moving Picture Experts Group 2-Transport Stream (MPEG2-TS) standard.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Embodiments of the present invention relate to a technique for supporting a variable-length transport packet that enables more efficient data transmission in a audio and video communication system.

A process of transmitting a video/audio/data stream in a audio and video communication system is described in detail below, according to an embodiment of the present invention.

Data that is transmitted for the transport packet is video stream, audio stream, and Internet Protocol (IP) stream data. The video stream is compressed and is then converted into a video Packetized Elementary Stream (PES) packet. Thereafter, the converted packet is included in a payload of the transport packet. In addition, the audio stream is compressed and is then converted into an audio PES packet. Thereafter, the converted packet is included in the payload of the transport packet. The data stream is converted into a Multi Protocol Encapsulation (MPE) stream packet and is then included in the payload of the transport packet. Herein, the data stream may include IP data.

According to an embodiment of the present invention, a communication system employs a variable-length transport packet.

FIG. 1 is a diagram illustrating a structure of a transport packet conforming to the conventional MPEG2-TS standard. Referring to FIG. 1, a TS packet has a size of 188. bytes in total, and includes a sync signal 110, a header 120, and an adaptation field/payload 130. Although it is shown in FIG. 1 that the sync signal 110 and the header 120 are separated from each other, the sync signal 110 can be defined as a part of the header 120. A first byte of the TS packet is the sync signal 110, which has a value of 0x47. By using the sync signal 110, a receiving end can obtain a synchronization of each TS packet by repetitively detecting the value of 0x47. with a period of 188. bytes from an input stream. Specifically, the receiving end can obtain the synchronization of each TS packet by determining whether the value of 0x47. is repetitively detected with the period of 188. bytes. Even if the sync signal 110 has a size of one byte and cannot provide a pattern having a length capable of ensuring reliability of sync detection, reliability of synchronization can be compensated for since periodicity is added due to a characteristic of a fixed-length transport packet.

However, according to an embodiment of the present invention, the periodicity of a sync pattern is not maintained when using a variable-length transport packet. Additionally, when a length of the transport packet increases, the value of 0x47,. which is a synch pattern of the conventional TS packet, can be present with a probability of $\frac{1}{2}^8 (= \frac{1}{256}.)$ on average in a payload. When this occurs, a position can be recognized as a sync signal. Further, since there is no information indicating a start position of a next transport packet, the receiving end cannot refer to a sync signal of a neighboring transport packet. Therefore, in order to use the variable-length transport packet, a new method of assigning/detecting a sync signal is required.

In accordance with an embodiment of the present invention, when receiving a data transport packet, a synchronization of the transmitted data transport packet needs to be found first. In order to find the synchronization, the data transport packet needs to be configured using a method capable of ensuring reliability of a sync signal.

According to an embodiment of the present invention, the transport packet includes at least one sync signal. If the transport packet has a length less than or equal to N bits, only one start sync signal is included. If the transport packet has a length exceeding N bits, two or more sync signals are included. When two or more sync signals are included, an interval between sync signals is determined according to a pre-defined value. Therefore, a receiving end can know the interval between the sync signals even if there is no additional information. When a plurality of sync signals are included, according to an embodiment of the present invention, a transmitting end provides information capable of identifying a start sync signal and the remaining sync signals. For example, the transmitting end can set different patterns for the start sync signal and the remaining sync signals. In another example, the transmitting end can attach a flag to a front or rear portion of each sync signal, and can set a different flag for the start sync signal and the remaining sync signals. The aforementioned two examples can be applied individually or together.

FIGS. 2A-2F are diagrams illustrating a transport packet structure in a audio and video communication system, according to an embodiment of the present invention.

Figure 2A:
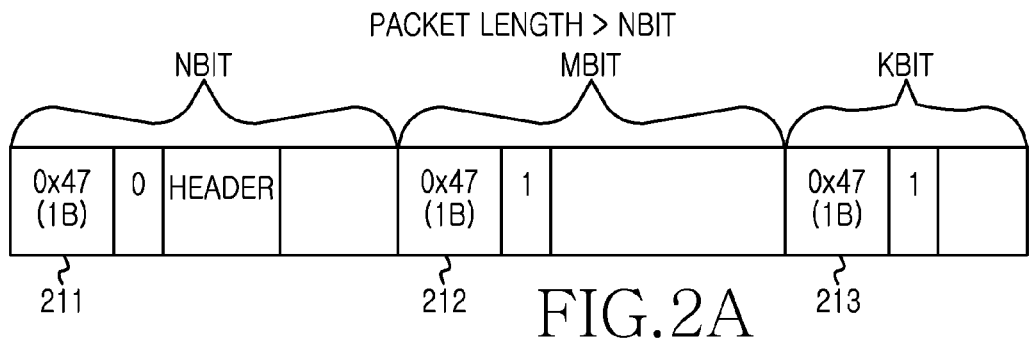
FIGS. 2A-2F are diagrams illustrating a transport packet structure in a audio and video communication system, according to an embodiment of the present invention.

FIG. 2A illustrates an embodiment in which a first sync signal (i.e., a start sync signal) is identified by using a flag in a transport packet that includes a plurality of sync signals. An interval between the sync signals is N bits, M bits, and K bits. A second sync signal 212 is located N bits after a start position of a first sync signal 211. A third sync signal 213 is located M bits after a start position of the second sync signal 212. The values N, M, and K are pre-defined, and may be equal to or different from one another. In addition, a flag is located at a rear portion of each sync signal. A flag for the first sync signal 211 is set to '0' and flags for the remaining sync signals 212 and 213 are set to '1', thereby identifying the first sync signal 211. Although FIG. 2A shows that a sync pattern is 0x47,. the sync pattern may be set to a different value.

Figure 2B:
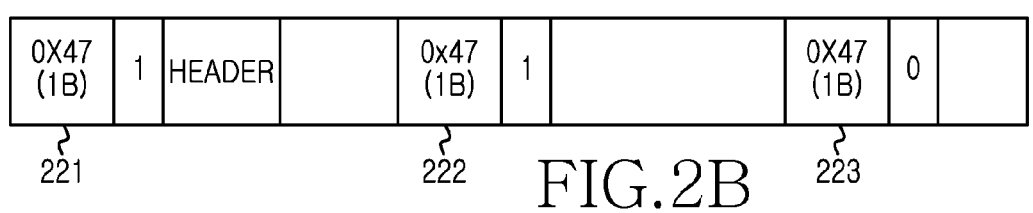

FIG. 2B illustrates an embodiment in which a last sync signal is identified by using a flag in a transport packet that includes a plurality of sync signals. An interval between the sync signals is N bits, M bits, and K bits. A second sync signal 222 is located N bits after a start position of a first sync signal 221. A third sync signal 223 is located M bits after a start position of the second sync signal 222. The values N, M, and K are pre-defined, and may be equal to or different from one another. In addition, a flag is located at a rear portion of each sync signal. A flag for the last sync signal (i.e., the third sync signal) 223 is set to '0' and flags for the remaining sync signals 221 and 222 are set to '1', thereby identifying the third sync signal 223. Although FIG. 2B shows that a sync pattern is 0x47,. the sync pattern may be set to a different value.

Figure 2C:
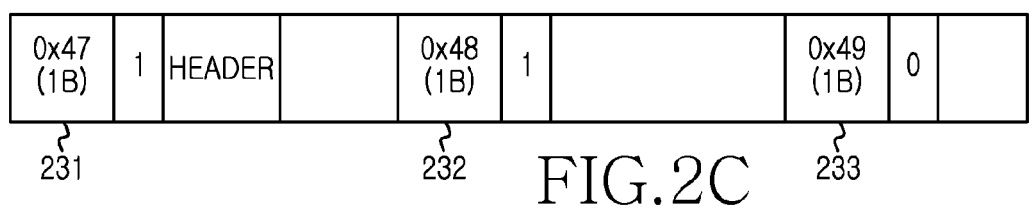

FIG. 2C illustrates an embodiment in which a last sync signal is identified by using a flag in a transport packet that includes a plurality of sync signals, and each sync signal is identified using a sync pattern. An interval between the sync signals is N bits, M bits, and K bits. A second sync signal 232 is located N bits after a start position of a first sync signal 231. A third sync signal 233 is located M bits after a start position of the second sync signal 232. The values N, M, and K are pre-defined, and may be equal to or different from one another. In addition, a flag is located at a rear portion of each sync signal. A flag for the last sync signal (i.e., the third sync signal) 233 is set to '0' and flags for the remaining sync signals 231 and 232 are set to '1', thereby identifying the third sync signal 233. In addition, a sync pattern of the first sync signal 231 is '0x47', a sync pattern of the second sync signal 232 is '0x48', and a sync pattern of the third sync signal 233 is '0x49'. Specifically, the sync pattern is different depending on a location of the sync signal. Accordingly, the sync signals 231 to 233 are identified using the sync pattern values. Although it is shown in FIG. 2C that a sync pattern is 0x47,. the sync pattern may be set to a different value. In addition, although it is shown in FIG. 2C that the sync pattern has an increment of '1' between sync signals, the increment unit may vary. The sync patterns may change in a decrementing manner or may change to pre-defined random patterns.

Figure 2D:
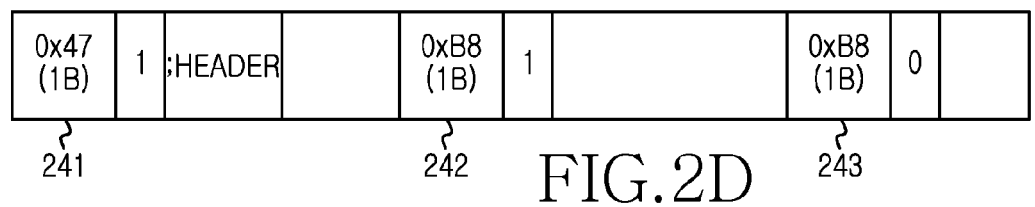

FIG. 2D illustrates an embodiment in which a last sync signal is identified by using a flag in a transport packet that includes a plurality of sync signals, and a start sync signal is identified using a sync pattern. An interval between the sync signals is N bits, M bits, and K bits. A second sync signal 242 is located N bits after a start position of a first sync signal 241. A third sync signal 243 is located M bits after a start position of the second sync signal 242. The values N, M, and K are pre-defined, and may be equal to or different from one another. Further, a flag is located at a rear portion of each sync signal. A flag for the last sync signal (i.e., the third sync signal) 243 is set to '0' and flags the remaining sync signals 241 and 242 are set to '1', thereby identifying the third sync signal 243. Furthermore, a sync pattern of the first sync signal 241 is '0x47', and sync patterns of the remaining sync signals 242 and 243 are '0xB8'. Specifically, the start sync signal 241 is identified by using the sync pattern. Although it is shown in FIG. 2D that a sync pattern is 0x47. or 0xB8,. the sync pattern may also be set to a different value.

Figure 2E:
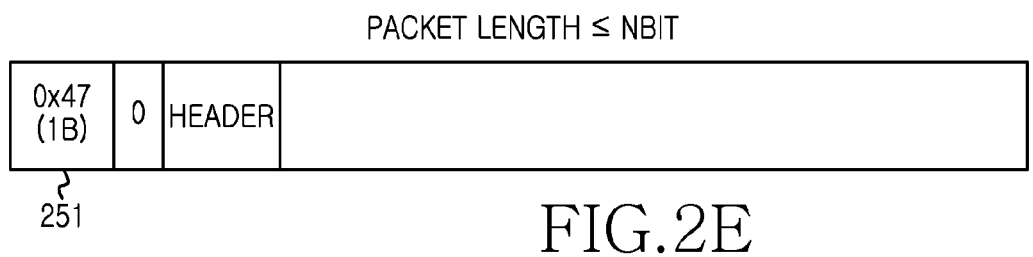

FIG. 2E illustrates an embodiment in which a first sync signal (i.e., a start sync signal) is identified by using a flag in a transport packet that includes one sync signal. A transport packet length is less than or equal to N bits. A single sync signal 251 having a sync pattern of '0x47' is included, and a flag is located at a rear portion of the sync signal 251. The flag is set to '0'. Accordingly, when applied together with the embodiment of FIG. 2A, a receiving end can recognize that the sync signal 251 is a first signal. Alternatively, when applied together with the embodiment of FIG. 2B, the receiving end can recognize that the sync signal 251 is a last signal. Alternatively, when applied together with the embodiment of FIG. 2C or FIG. 2D, the receiving end can recognize that the sync signal 251 is both the first signal and the last signal.

Figure 2F:
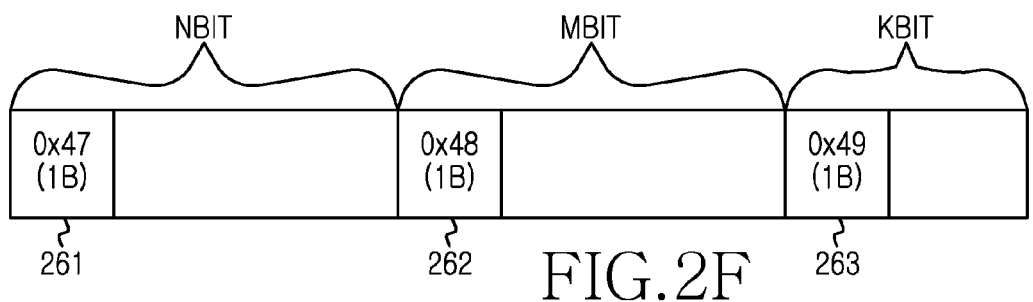

FIG. 2F illustrates an embodiment in which each sync signal is identified by using a sync pattern in a transport packet that includes a plurality of sync signals. An interval between the sync signals is N bits, M bits, and K bits. A second sync signal 262 is located N bits after a start position of a first sync signal 261. A third sync signal 263 is located M bits after a start position of the second sync signal 262. Herein, the values N, M, and K are pre-defined, and may be equal to or different from one another. A sync pattern of the first sync signal 261 is '0x47', a sync pattern of the second sync signal 262 is '0x48', and a sync pattern of the third sync signal 263 is '0x49'. Specifically, the sync pattern is different depending on a location of the sync signal. Accordingly, the sync signals 261 to 263 are identified by using the sync pattern values. Although FIG. 2F shows that a sync pattern starts from 0x47,. the sync pattern may start from a different value. In addition, although FIG. 2F shows that the sync pattern has an increment of '1' between sync signals, the increment unit may vary. The sync patterns may change in a decrementing manner or may change to pre-defined random patterns.

According to an embodiment of the present invention, a transport packet includes a sync pattern having a length greater than one byte as a start sync signal. For example, the sync pattern may be 2. to 4. bytes. Specifically, in order to ensure detection reliability of a sync signal by decreasing a probabilistic occurrence rate of the sync pattern, a sync pattern having a length of M bits can be used according to a maximum allowed length of the transport packet. An occurrence probability per sync pattern length with respect to each transport packet length is shown in Table 1. below. The greater the probability, the higher the possibility that a bit stream having the same value as the sync pattern occurs on a payload.

TABLE 1

| Maximum Packet length (bit) | 8 bit sync pattern | 12 bit sync pattern | 24 bit sync pattern | 32 bit sync pattern |
|---|---|---|---|---|
| 2048 | 0.999669752 | 0.030766997 | 0.000122063 | 4.76837E−07 |
| 4096 | 0.999999891 | 0.060587385 | 0.000244111 | 9.53674E−07 |
| 8192 | 1 | 0.117503939 | 0.000488162 | 1.90735E−06 |
| 16384 | 1 | 0.221200702 | 0.000976086 | 3.81469E−06 |
| 32768 | 1 | 0.393471654 | 0.001951219 | 7.62937E−06 |
| 65536 | 1 | 0.632123366 | 0.003898631 | 1.52587E−05 |
| 131072 | 1 | 0.864666782 | 0.007782062 | 3.05171E−05 |
| 262144 | 1 | 0.98168492 | 0.015503563 | 6.10333E−05 |
| 524288 | 1 | 0.999664558 | 0.030766766 | 0.000122063 |

As shown in Table 1. above, the longer the length of the sync pattern, the lower the possibility that the bit stream having the same value as the sync pattern occurs. Thus, the longer the length of the sync pattern, the higher the reliability of the sync signal.

Figure 3A:
FIGS. 3A-3D are diagrams illustrating a transport packet structure in a communication system, according to an embodiment of the present invention.
Figure 3B:
Figure 3C:
Figure 3D:

FIGS. 3A-3D are diagrams illustrating a transport packet structure in a communication system, according to an embodiment of the present invention. FIG. 3A and FIG. 3B are diagrams illustrating a situation in which a sync pattern having a length of 4. bytes is used. FIG. 3C and FIG. 3D are diagrams illustrating a situation in which a sync pattern having a length of 2. bytes is used. In addition to the lengths illustrated in FIGS. 3A-3D, a sync pattern having a length of 3. bytes can be used. In FIGS. 3A-3D, sync patterns are '0x47474747', '0x4748494A', '0x4747', and '0x4748'. More specifically, the same byte value is present in a repetitive manner or an incrementing manner. However, the sync pattern may also involve a decrementing byte value, or an inverting byte value, for example.

According to an embodiment of the present invention, a transmitting end appends information that announces a start position of a next transport packet. For example, the transmitting end can add a packet length field, which indicates a transport packet length, into a header of a transport packet. The packet length field can represent a length between a next field of the packet length field and a last packet position in an m-bit unit. If the packet length field is set to k, a receiving end can determine that the next transport packet starts k×m bits later. The transmitting end may also append a sync number field that represents the number of sync signals arranged with a pre-defined interval. The receiving end can calculate a transport packet length by using the value of the sync number field and the pre-defined interval between sync signals, and thus can determine a start position of the next transport packet.

Even if the information that indicates the transport packet length is included, when an error correction based on Forward Error Correction (FEC) fails after the transport packet passes a channel, transport packet length information and a sync signal included in a header may be erroneous. Therefore, the transmitting end can add a Cyclic Redundancy Check (CRC) code including a start sync signal of the transport packet. Specifically, the transmitting end appends the CRC code to the header including the start sync signal. By appending the CRC code to the header including the sync signal, reliability of the sync signal and reliability of the information that indicates the transport packet length is improved.

Figure 4A:
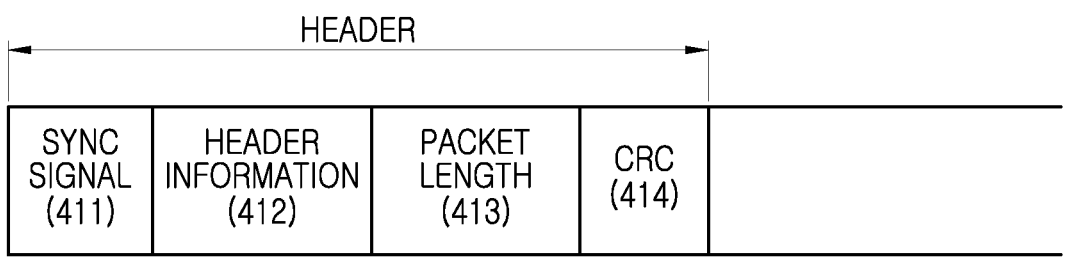
FIGS. 4A and 4B are diagrams illustrating a transport packet structure in an audio and video communication system, according to an embodiment of the present invention.
Figure 4B:
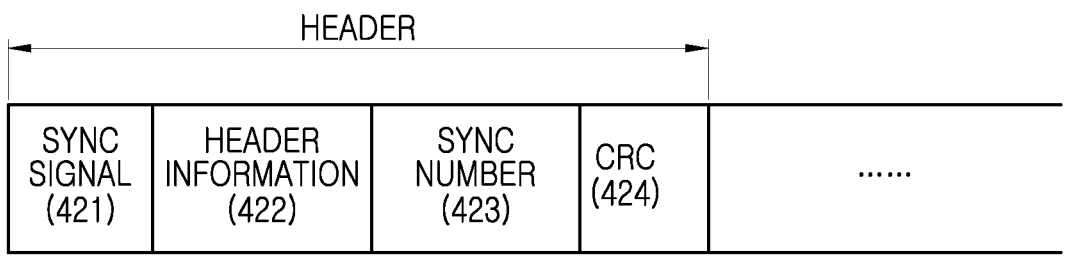

FIGS. 4A and 4B are diagrams illustrating a transport packet structure in a audio and video communication system, according to an embodiment of the present invention.

FIG. 4A shows a situation in which a packet length field is included. A header includes a sync signal field 411, a header information field 412 including extra information other than the sync signal, a packet length field 413, and a CRC field 414. For example, 16. bits can be assigned to the packet length field 413. If the packet length field 413 is expressed in a byte unit, the packet length field 413 can represent a transport packet length in up to 65535. bytes after the packet length field 413. In addition, by appending a CRC code for a whole header, reliability of the whole header including the sync signal field 411 and the packet length field 413 is improved.

FIG. 4B illustrates a situation in which a sync number field is included. A header includes a sync signal field 421, a header information field 422 including extra information other than the sync signal, a sync number field 423, and a CRC field 424. By using the sync number field 423, a length of a transport packet can be indirectly determined from pre-defined interval information of sync signals. For example, when the interval between sync signals is defined to 256. bytes, if a value of the sync number field 423 is n, it implies that a next transport packet starts between a position separated by n×256+k bytes from a start position of a corresponding transport packet, and a position separated by (n+1)×256. bytes from the start position. Herein, k is a value obtained by adding '1' to the number of bytes of the header including the sync signal field 421 and the CRC field 424. In addition, by appending a CRC code for a whole header, reliability of the whole header including the sync signal field 421 and the packet length field 423 is improved.

The aforementioned embodiments of the present invention are not necessarily performed in a mutually exclusive manner, and thus can be applied individually or together.

Figure 5:
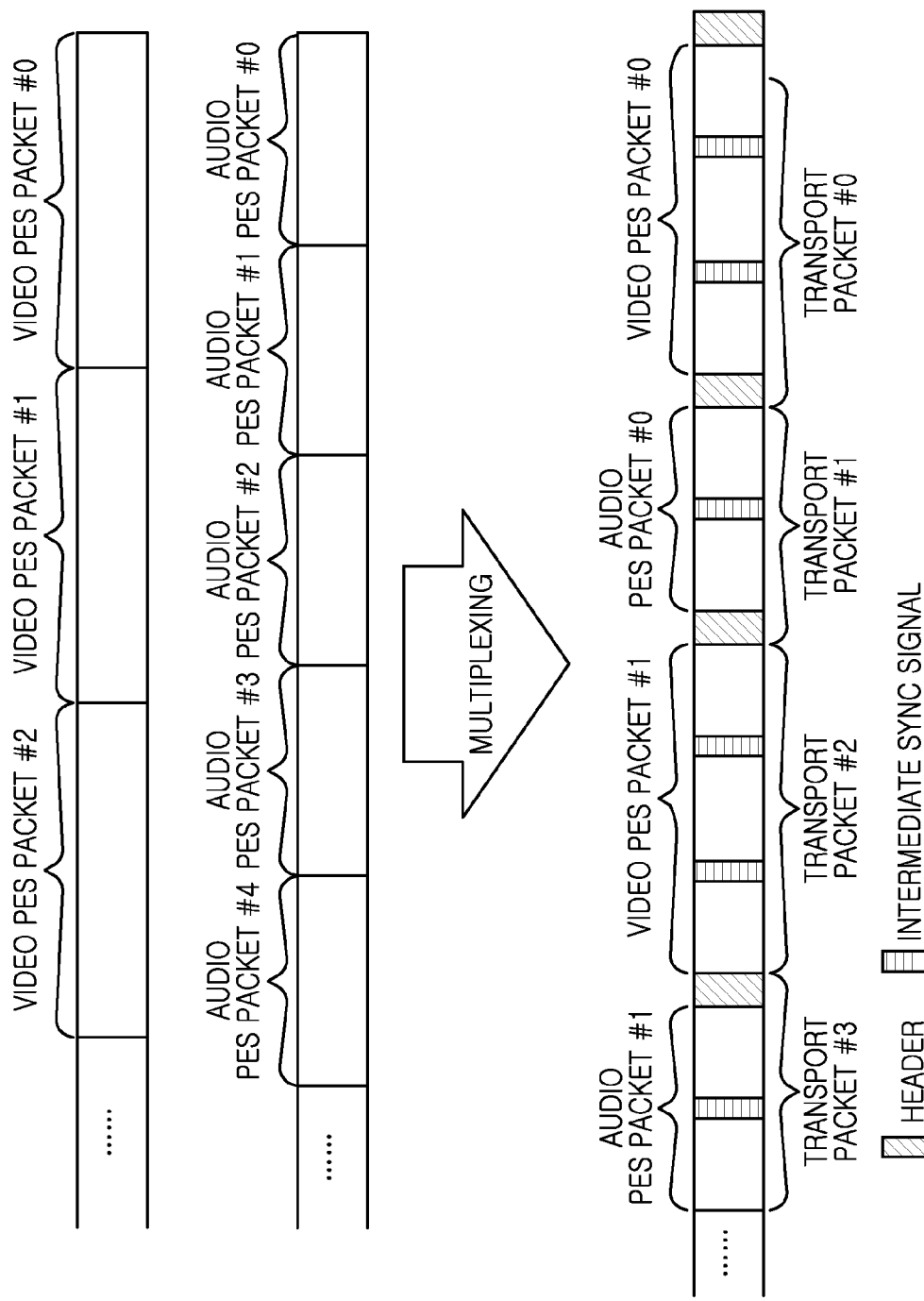
FIG. 5 is a diagram illustrating a process of generating a transport packet in an audio and video communication system, according to an embodiment of the present invention.

FIG. 5 is a diagram illustrating a process of generating a transport packet in a audio and video communication system, according to an embodiment of the present invention.

Referring to FIG. 5, a video stream is processed in a format of a video PES packet, and an audio stream is processed in a format of an audio PES packet. The PES packet implies an audio stream or video stream packetized in a specific unit to store or transmit the packet.

To perform transmission through a channel, the video PES packets and the audio PES packets are converted into transport packets through multiplexing. A size of the transport packets is determined depending on each size of the video PES packets and the audio PES packets. Specifically, as illustrated in FIG. 5, it is determined that a length of a transport packet #0 includes a video PES packet #0, a length of a transport packet #1 includes an audio PES packet #0, a length of a transport packet #2 includes a video PES packet #1, and a length of a transport packet #3 includes an audio PES packet #1. Accordingly, the length of the transport packets varies.

When generating the transport packets, a transport packet having a length exceeding a reference length (i.e., N bits) includes a start sync signal included in a header and at least one intermediate sync signal. In FIG. 5, all transport packets have a length exceeding the reference length. The number of intermediate sync signals included therein is determined depending on the length of the transport packet.

A header of each transport packet may be configured according to at least one of the aforementioned embodiments of the present invention. For example, the header may include a 2-byte packet length field and a 1-byte CRC code, and may consist of 7 bytes in total. In addition, a pattern of the start sync signal included in the header can be set to '0x47', and a pattern of the intermediate sync signal may be set in an incrementing manner so as to distinguish the intermediate sync signal from the start sync signal. Specifically, a first intermediate sync signal may be '0x48', and a second intermediate sync signal may be '0x49.. Additionally, an interval between the respective sync signals may be 256. bytes. In this case, the transport packet #0 is configured such that a video PES packet #0 is divided into a first part having a size of 249. bytes from the start, a second part having a size of 255. bytes after the first part, and a third part after the second part. The transport packet #0 is then combined in an order of the header, the first part, the intermediate sync 1, the second part, the intermediate sync 2, and the third part.

Table 2. shows a result of a comparison between a transport packet, according to an embodiment of the present invention, and an additional information amount of the conventional MPEG2-TS packet.

TABLE 2

| PES size | MPEG2-TS | Embodiment A (188) | Embodiment B (256) |
|---|---|---|---|
| N < 182 | 188-N | 6 | 6 |
| 182 | 6 | 6 | 6 |
| 184 | 4 | 7 | 6 |
| 182 × 2 | 12 | 7 | 7 |
| 184 × 2 | 8 | 7 | 7 |
| 64 × 1024 | 1580 | 356 | 263 |

In Table 2. above, embodiment A of the present invention has a 1-byte sync signal added in every 188. bytes, and embodiment B of the present invention has a 1-byte sync signal added in every 256. bytes. A start sync signal is 6. bytes, including an MPEG2-TS header and a 2-byte packet length field. As shown in Table 2,. to transmit 64k-byte PES data, embodiments of the present invention can decrease an overhead by at least 1. k bytes in comparison with MPEG2-TS.

Figure 6:
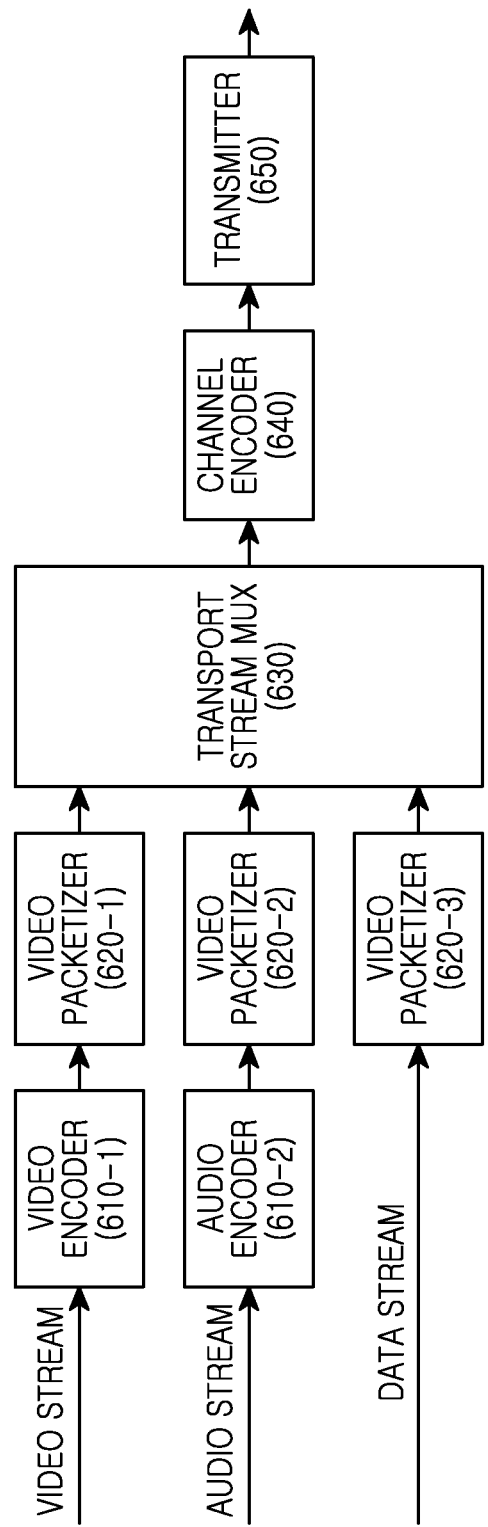
FIG. 6 is a block diagram illustrating a structure of a transmitting end in an audio and video communication system, according to an embodiment of the present invention.

FIG. 6 is a block diagram illustrating a structure of a transmitting end in a audio and video communication system, according to an embodiment of the present invention.

Referring to FIG. 6, the transmitting end includes a video encoder 610-1, an audio encoder 610-2, a video packetizer 620-1, an audio packetizer 620-2, a data packetizer 620-3, a transport stream Multiplexer (MUX) 630, a channel encoder 640, and a transmitter 650.

The video encoder 610-1 compresses a video stream according to a video codec. The audio encoder 610-2 compresses an audio stream according to an audio codec. The video packetizer 620-1 divides the compressed video stream by a specific unit to generate video PES packets. The audio packetizer 620-2 divides the compressed audio stream by a specific unit to generate audio PES packets. Each of the PES packets includes a PES header. The PES header includes information (e.g., time stamp information) required to reproduce the audio stream and the video stream. The data packetizer 620-3 divides a data stream by a specific unit to generate MPE stream packets.

The transport stream MUX 630 selects a bit stream of the video PES packets, the audio PES packets, the MPE stream packets as a payload, and inserts a transport packet header to generate transport packets. The transport stream MUX 630 generates the transport packets according to the aforementioned embodiments of the present invention. More specifically, the transport stream MUX 630 determines a range to be included in one transport packet of data for the audio PES packets and the video PES packets. For example, the transport stream MUX 630 can determine which packet will be transmitted between the audio PES packet and the video PES packet, and thereafter, can determine to transmit one selected audio/video PES packet as one transport packet. The transport stream MUX 630 generates a header of a transport packet including a start sync signal.

According to an embodiment of the present invention, if a transport packet length exceeds a reference size (i.e., N bits), the transport stream MUX 630 inserts at least one intermediate sync signal, according to a pre-defined interval between sync signals. A pattern of the intermediate sync signal may be identical to that of the start sync signal. According to another embodiment of the present invention, the pattern of the intermediate sync signal may be different from that of the start sync signal. Additionally, the start sync signal and the intermediate sync signal may have a size greater than or equal to 2. bytes.

According to an embodiment of the present invention, the transport stream MUX 630 can insert at least one sync signal flag to a front or rear portion of each sync signal. The sync signal flag can be used to identify a start sync signal or to identify a last sync signal.

According to an embodiment of the present invention, the transport stream MUX 630 inserts information that indicates a transport packet length. The packet length implies an actual packet length including a CRC code and an intermediate sync signal. For example, the information that indicates the transport packet length may be a packet length field that implicitly indicates the transport packet length, or may be a sync number field that indicates the number of sync signals included in the transport packet. If the packet length field is included, the packet length field can be set to a value that indicates a length from a last packet position to a next field of the packet length field.

According to an embodiment of the present invention, the transport stream MUX 630 generates a CRC code for the header and inserts the CRC code. For example, the CRC code can be inserted to a rear portion of the information that indicates the transport packet length.

The channel encoder 640 performs channel encoding on transport packets. The transmitter 650 transmits the channel-encoded transport packets through a channel. The channel may be a wired channel or a wireless channel. When using a wireless channel, the transmitter 650 generates complex symbols by modulating a bit stream of the transport packets, processes the generated symbols in a physical layer according to a communication system protocol, up-converts the processed symbols into Radio Frequency (RF) signals, and then transmits the RF signals through an antenna.

Figure 7:
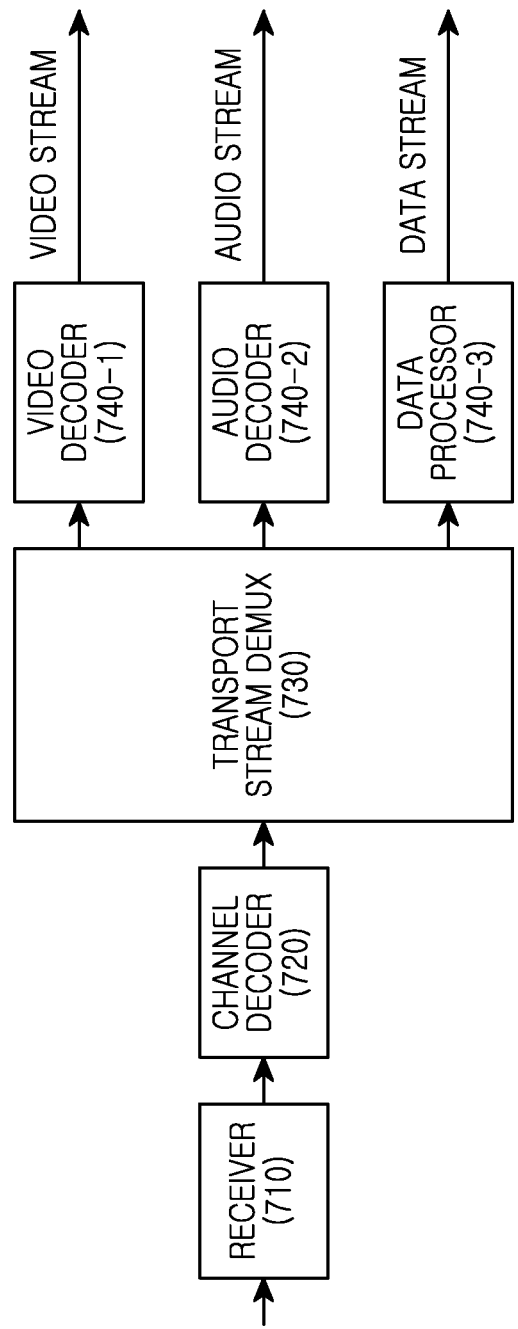
FIG. 7 is a block diagram illustrating a structure of a receiving end in an audio and video communication system, according to an embodiment of the present invention.

FIG. 7 is a block diagram illustrating a structure of a receiving end in a audio and video communication system, according to an embodiment of the present invention.

Referring to FIG. 7, the receiving end includes a receiver 710, a channel decoder 720, a transport stream De-multiplexer (DEMUX) 730, a video decoder 740-1, an audio decoder 740-2, and a data processor 740-3.

The receiver 710 restores channel-encoded transport packets from a signal received through a channel. The channel may be a wired channel or a wireless channel. When a wireless channel is used, the receiver 710 converts an RF signal received through an antenna into a baseband signal, processes the baseband signal in a physical layer according to a communication system protocol, and restores a bit stream by using demodulation. The channel decoder 720 performs channel decoding on the channel-encoded transport packets, and provides a bit stream of the transport packets to the transport stream DEMUX 730.

The transport stream DEMUX 730 obtains a packet synchronization by using a sync signal from the transport packets, and extracts a video stream and an audio stream from the transport packet. The transport stream DEMUX 730 detects respective sync signals of the transport packets according to the aforementioned embodiments of the present invention. More specifically, the transport stream DEMUX 730 detects at least one sync signal. The at least one sync signal includes a start sync signal included in a header.

According to an embodiment of the present invention, if a transport packet length is greater than a reference size, the at least one sync signal may include at least one intermediate sync signal included in the middle of the payload. The start sync signal and the intermediate sync signal have a pre-defined pattern, and an interval between the sync signals is based on a predetermined rule. Therefore, the transport stream DEMUX 730 can detect the at least one sync signal by searching for the pre-defined pattern in every the pre-determined interval. The start sync signal may have a size that is greater than or equal to 2. bytes. If the start sync signal is greater than or equal to 2. bytes, a pattern of the start sync signal can be determined by repeating, incrementing, decrementing, or inverting a 1-byte pattern.

According to an embodiment of the present invention, to acquire header information, the transport stream DEMUX 730 can identify the start sync signal by using at least one of a sync signal flag and a sync signal pattern. The transport packet may include a sync signal flag for identifying a start sync signal or a last sync signal. If the sync signal flag is configured to identify the start sync signal, the transport stream DEMUX 730 can detect the start sync signal by using the sync signal flag. Alternatively, a pattern of the start sync signal can be configured differently from a pattern of the at least one intermediate sync signal. The transport stream DEMUX 730 can detect the start sync signal by using the pattern of the sync signal. If a start point location of a current transport packet is determined from information included in a previous transport packet, the transport stream DEMUX 730 can detect the start sync signal by referring to the start point location of the transport packet.

According to an embodiment of the present invention, the transport stream DEMUX 730 detects a header error by using a CRC code. For example, the CRC code can be inserted into a rear portion of information that indicates a length of the transport packet. Therefore, the transport stream DEMUX 730 extracts the CRC code, which is spaced apart by a specific distance from the start sync signal, and determines whether an error occurs by using the CRC code. If the error occurs, the transport stream DEMUX 730 determines that information on the start sync signal and the header is not reliable, and thus discards the transport packet.

According to an embodiment of the present invention, the transport stream DEMUX 730 can determine a start point of a next transport packet by using the information that indicates the transport packet length. For example, the information that indicates the transport packet length may be a packet length field that implicitly indicates the transport packet length or may be a sync number field that indicates the number of sync signals included in the transport packet. If the packet length field is used, the packet length field can be set to a value that indicates a length from a last packet position to a next field of the packet length field. The transport stream DEMUX 730 can determine the transport packet length according to a value of the packet length field. When using the sync number field, which indicates the number of sync signals, the transport stream DEMUX 730 predicts the transport packet length by using a pre-defined interval between the sync signals. The transport stream DEMUX 730 can determine a specific range for the transport packet length.

The video decoder 740-1 decompresses a video stream, which is compressed according to a video compression code used in a transmitting end, thereby restoring the video stream. The audio decoder 740-2 decompresses an audio stream, which is compressed according to an audio compression code used in the transmitting end, thereby restoring the audio stream. The data processor 740-3 interprets a data stream, and performs a process corresponding to information of the interpretation result.

Figure 8:
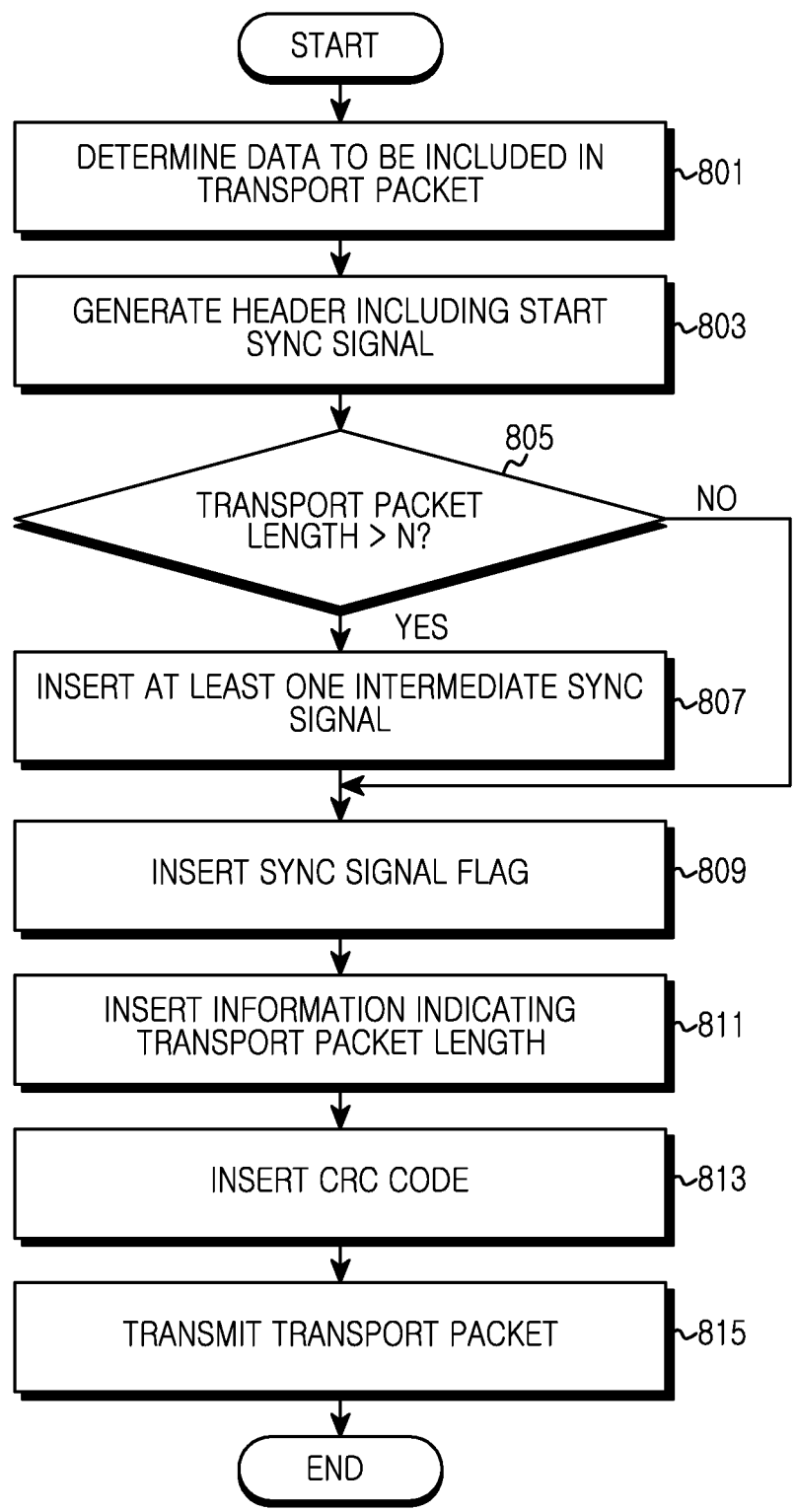
FIG. 8 is a flowchart illustrating operations of a transmitting end in an audio and video communication system, according to an embodiment of the present invention.

FIG. 8 is a flowchart illustrating operations of a transmitting end in a audio and video communication system, according to an embodiment of the present invention. The operations of FIG. 8 include the generation a PES packet and the generation and transmission of one transport packet.

Referring to FIG. 8, the transmitting end determines a range of audio or video PES packets to be included in one transport packet of data, in step 801. Specifically, since a variable-length transport packet is transmitted, the transmitting end determines an amount of data to be included in the transport packet. For example, the transmitting end can determine which packet will be transmitted between the audio PES packet and the video PES packet, and thereafter can determine to transmit one selected audio/video PES packet as one transport packet. The audio PES packet and the video PES packet can be transmitted in an alternating manner, as illustrated in FIG. 5.

After determining the data to be included in one transport packet, in step 803, the transmitting end generates a header of a transport packet including a start sync signal. Specifically, the transmitting end generates the header including the start sync signal, a packet IDentifier (ID), and information indicating whether a payload includes from a start portion of a PES packet. According to an embodiment of the present invention, the start sync signal may have a size that is greater than or equal to 2. bytes. If the size of the start sync signal is greater than or equal to 2. bytes, a pattern of the start sync signal can be determined by repeating, incrementing, decrementing, or inverting a 1-byte pattern. Additionally, if the size of the start sync signal is k bits, it is preferable that $2^k$ is greater than a maximum transport packet size.

In step 805, the transmitting end determines whether a transport packet size exceeds a reference size (i.e., N bits). The transport packet length is determined by considering all of the information indicating a transport packet length to be added later, such as, for example, a CRC code. Additionally, it is preferable that the reference size be determined by considering a probability of occurrence of a bit stream having the same value as a sync signal pattern based on the payload size. If the transport packet length is less than or equal to the reference size, the transmitting end determines that there is no need to add an intermediate sync signal, and the methodology proceeds to step 809.

However, if the transport packet length is greater than the reference size, the transmitting end inserts at least one intermediate sync signal, in step 807. An interval between the intermediate sync signal and the start sync signal is based on a pre-defined rule. Additionally, if two or more intermediate sync signals are inserted, an interval between the intermediate sync signals is also based on the pre-defined rule. Therefore, without delivery of additional information, a receiving end can determine a location of the at least one intermediate sync signal from the location of the start sync signal. According to an embodiment of the present invention, a pattern of the intermediate sync signal may be identical to that of the start sync signal. According to another embodiment of the present invention, a pattern of the intermediate sync signal may be different from that of the start sync signal. Patterns of a plurality of intermediate sync signals may be the same, or may have values that change depending on an insertion order. According to an embodiment of the present invention, the intermediate sync signal may have a size that is greater than or equal to 2. bytes.

If the intermediate sync signal is greater than or equal to 2. bytes, a pattern of the intermediate sync signal can be determined by repeating, incrementing, decrementing, or inverting a 1-byte pattern. Additionally, if a size of the intermediate sync signal is k bits, it is preferable that $2^k$ is greater than a maximum transport packet size.

In step 809, the transmitting end inserts at least one sync signal flag. The sync signal flag is inserted into a front or rear portion of each sync signal. According to an embodiment of the present invention, the sync signal flag can be used to identify a start sync signal or to identify a last sync signal. Specifically, a flag for identification of a sync signal is set to a value different from flags for the remaining sync signals.

In step 811, the transmitting end inserts information that indicates a transport packet length. The packet length implies an actual packet length including a CRC code and an intermediate sync signal. For example, the information that indicates the transport packet length may be a packet length field that implicitly indicates the transport packet length, or may be a sync number field that indicates the number of sync signals included in the transport packet. If the packet length field is included, the packet length field can be set to a value that indicates a length from a last packet position to a next field of the packet length field.

In step 813, the transmitting end generates a CRC code for the header and inserts the CRC code. For example, the CRC code can be inserted into a rear portion of the information that indicates the transport packet length.

In step 815, the transmitting end performs channel encoding on the transport packet, and transmits the channel-encoded transport packet through a channel. The channel may be a wired channel or a wireless channel. When using a wireless channel, the transmitting end generates complex symbols by modulating a bit stream of the transport packets, processes the generated symbols in a physical layer according to a communication system protocol, up-converts the processed symbols into RF signals, and then transmits the RF signals through an antenna.

FIG. 8 applies the embodiments of the present invention, as described with respect to FIG. 2 through FIG. 4. However, the transmitting end can operate by selectively applying only some of the embodiments of the present invention. For example, if the sync signal flag is not used, step 809 can be skipped. Further, if the information that indicates the packet length is not used, step 811 can be skipped. Furthermore, if the CRC code is not used, step 813 can be skipped. Alternatively, if the intermediate sync signal is not used, steps 805, 807, and 809 can be skipped, and the start sync signal can have a size greater than or equal to 2. bytes.

Figure 9:
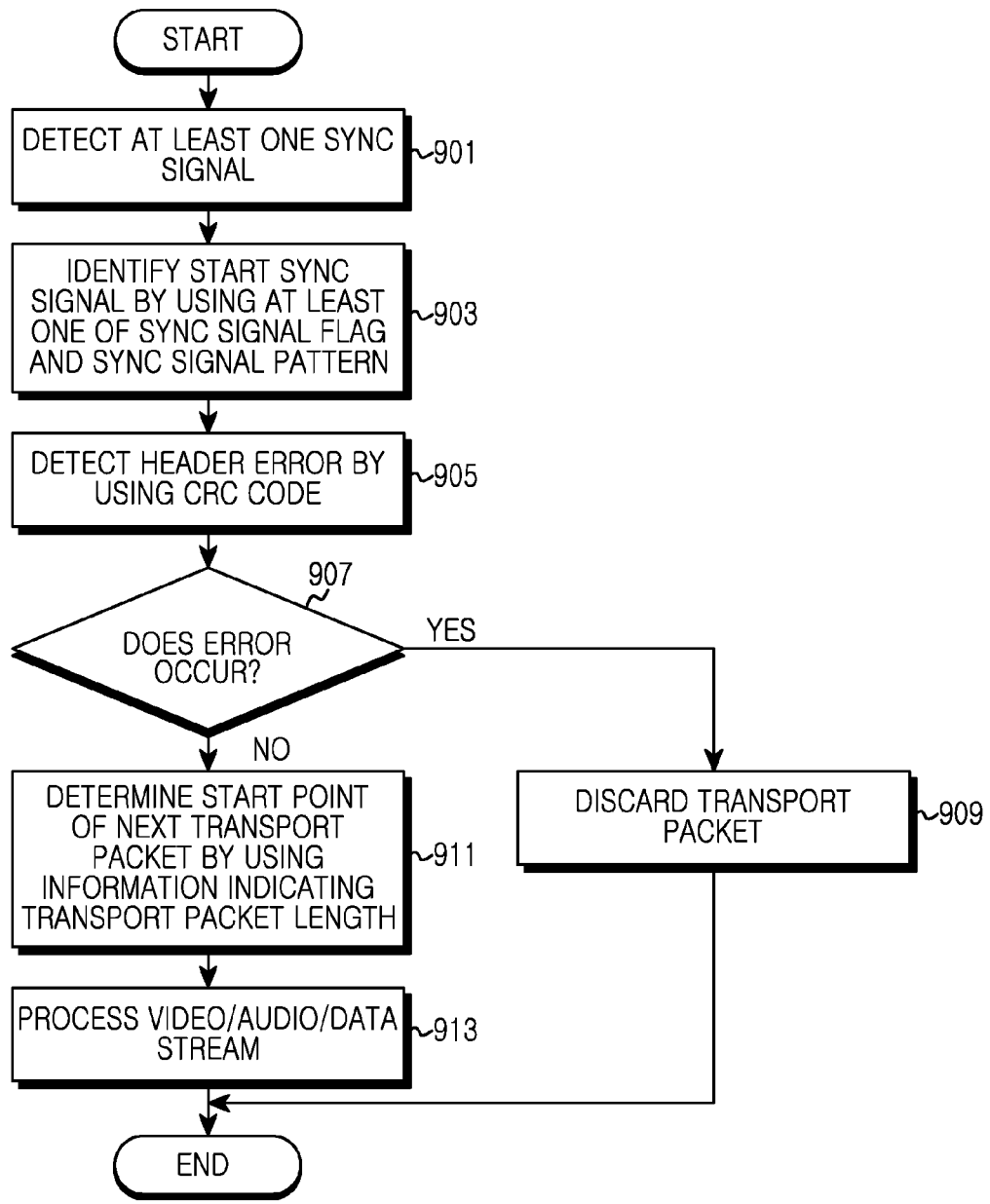
FIG. 9 is a flowchart illustrating operations of a receiving end in an audio and video communication system, according to an embodiment of the present invention.

FIG. 9 is a flowchart illustrating operations of a receiving end in a audio and video communication system, according to an embodiment of the present invention. The operations of FIG. 9 include data reception, channel decoding, and transport packet interpretation.

Referring to FIG. 9, the receiving end detects at least one sync signal, in step 901. Specifically, the receiving end obtains a synchronization of a transport packet by detecting the at least one sync signal. The at least one sync signal includes a start sync signal included in a header. Additionally, if a transport packet length is greater than a reference size, the at least one sync signal includes at least one intermediate sync signal included in the middle of the payload. The start sync signal and the intermediate sync signal have a pre-defined pattern, and an interval between the sync signals is based on a pre-defined rule. Therefore, the receiving end can detect the at least one sync signal by searching for the pre-defined pattern in every interval. According to an embodiment of the present invention, the start sync signal may have a size greater than or equal to 2 bytes. If the start sync signal is greater than or equal to 2. bytes, a pattern of the start sync signal can be determined by repeating, incrementing, decrementing, or inverting a 1-byte pattern. Additionally, if a size of the start sync signal is k bits, it is preferable that 2^k is greater than a maximum transport packet size.

In step 903, the receiving end identifies a start sync signal by using at least one of a sync signal flag and a sync signal pattern. Accordingly, the receiving end can acquire header information. According to an embodiment of the present invention, the transport packet may include a sync signal flag for identifying a start sync signal or a last sync signal. If the sync signal flag is configured to identify the start sync signal, the receiving end can detect the start sync signal by using the sync signal flag. According to an embodiment of the present invention, a pattern of the start sync signal can be configured differently from a pattern of the at least one intermediate sync signal. The receiving end can detect the start sync signal by using the pattern of the sync signal. If a start point location of a current transport packet is determined from information included in a previous transport packet, the receiving end can detect the start sync signal by referring to the start point location of the transport packet.

After detecting the start sync signal, in step 905, the receiving end detects a header error by using a CRC code. For example, the CRC code can be inserted to a rear portion of information that indicates a length of the transport packet. Therefore, the receiving end extracts the CRC code, which is spaced apart by a specific distance from the start sync signal, and determines whether an error occurs by using the CRC code.

In step 907, the receiving end determines whether an error occurs in the header. If the error occurs, the receiving end determines that information on the start sync signal and the header is not reliable, and thus, discards the transport packet, in step 909.

Otherwise, if the error does not occur, the receiving end determines a start point of a next transport packet by using the information that indicates the transport packet length, in step 911. For example, the information that indicates the transport packet length may be a packet length field that implicitly indicates the transport packet length, or may be a sync number field that indicates the number of sync signals included in the transport packet. If the packet length field is used, the packet length field can be set to a value that indicates a length from a next field of the packet length field to a last packet position. The receiving end can determine the transport packet length according to a value of the packet length field. When using the sync number field that indicates the number of sync signals, the receiving end predicts the transport packet length by using a pre-defined interval between the sync signals. The receiving end can determine a specific range for the transport packet length.

In step 913, the receiving end extracts an audio/video data stream from the transport packet, and processes the extracted stream. Since the data extracted from the transport packet is an audio/video PES packet or an MPE stream packet, the receiving end extracts an audio/video/data stream from the audio/video PES packet or the MPE stream packet, and decompresses the audio/video stream according to a compression code used in a transmitting end. Thereafter, the receiving end reproduces the data or performs a process based on information confirmed by interpreting a data stream.

FIG. 9 applies the embodiments of the present invention, as described in FIG. 2 through FIG. 4. However, the receiving end can operate by selectively applying only some of the embodiments of the present invention. For example, if the sync signal flag is not used, the receiving end uses only the sync signal pattern in step 903. Alternatively, if the start sync signal is identical to the intermediate sync signal, the receiving end uses only the sync signal flag in step 903. Further, if the sync signal flag is not used and the pattern of the start sync signal is identical to the intermediate sync signal, step 903 can be skipped. Additionally, if the information indicating the packet length is not used, step 911 can be skipped. Further, if the CRC code is not used, steps 905 to 909 can be skipped. Alternatively, if the intermediate sync signal is not used, the receiving end detects only the start sync signal having a size greater than or equal to 2. bytes, in step 901.

According to embodiments of the present invention, an intermediate sync signal is assigned depending on a transport packet length in a audio and video communication system. Therefore, a synchronization of a variable-length transport packet can be effectively provided, and overhead caused by a sync signal can be minimized.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of operating a transmitting end in a communication system, the method comprising the steps of:
   determining data to be transmitted through a transport packet of variable-length;
   generating a header of the transport packet, wherein the header comprises a start sync signal;
   determining a length of the transport packet;
   inserting at least one intermediate sync signal into the transport packet according to a pre-defined interval between sync signals, if the determined length of the transport packet exceeds a reference size; and
   transmitting the transport packet.

2. The method of claim 1, further comprising:
   inserting a flag for the start sync signal and at least one flag for the at least one intermediate sync signal.

3. The method of claim 2, wherein the flag for the start sync signal is set to a value that is different from that of the at least one flag for the at least one intermediate sync signal.

4. The method of claim 2, wherein a flag for a last sync signal from among the at least one intermediate sync signal is set to a value that is different from that of the flag for the start sync signal.

5. The method of claim 1, wherein a value of a pattern of the start sync signal is different from that of the at least one intermediate sync signal.

6. The method of claim 5, wherein, if the at least one intermediate sync signal comprises a plurality of intermediate sync signals, respective patterns of the plurality of intermediate sync signals have different values.

7. The method of claim 1, further comprising:
   inserting information that indicates a length of the transport packet into the transport packet.

8. The method of claim 7, wherein the information that indicates the length of the transport packet comprises one of a packet length field that indicates the transport packet length and a sync number field that indicates a number of sync signals included in the transport packet.

9. A method of operating a receiving end in a communication system, the method comprising the steps of:
   obtaining a synchronization of a transport packet of variable-length by detecting a start sync signal comprised in a header of the transport packet and at least one intermediate sync signal arranged in the transport packet according to a pre-defined interval between sync signals;
   extracting a stream from the transport packet; and
   processing the stream.

10. The method of claim 9, further comprising:
    identifying the start sync signal by using a flag for the start sync signal and at least one flag for the at least one intermediate sync signal.

11. The method of claim 10, wherein the flag for the start sync signal is set to a value that is different from that of the at least one flag for the at least one intermediate sync signal.

12. The method of claim 10, wherein a flag for a last sync signal from among the at least one intermediate sync signal is set to a value that is different from that of the flag for the start sync signal.

13. The method of claim 9, further comprising:
    identifying the start sync signal by using a pattern of each of the start sync signal and the at least one intermediate sync signal.

14. The method of claim 13, wherein the pattern of the start sync signal is set to a value that is different from that of the pattern of the at least one intermediate sync signal.

15. The method of claim 14, wherein, if the at least one intermediate sync signal comprises a plurality of intermediate sync signals, respective patterns of the plurality of intermediate sync signals have different values.

16. The method of claim 9, further comprising:
    determining a start point of a next transport packet by using information that indicates a length of the transport packet.

17. The method of claim 16, wherein the information that indicates the length of the transport packet comprises one of a packet length field that indicates the transport packet length and a sync number field that indicates a number of sync signals included in the transport packet.

18. A transmitting-end apparatus in a communication system, the apparatus comprising:
    a Multiplexer (MUX) for determining data to be transmitted through a transport packet of variable-length, generating a header of the transport packet, wherein the header comprises a start sync signal, determining a length of the transport packet, and inserting at least one intermediate sync signal into the transport packet according to a pre-defined interval between sync signals, if the determined length of the transport packet exceeds a reference size; and
    a transmitter for transmitting the transport packet.

19. The apparatus of claim 18, wherein the MUX inserts a flag for the start sync signal and at least one flag for the at least one intermediate sync signal.

20. The apparatus of claim 19, wherein the flag for the start sync signal is set to a value that is different from that of the at least one flag for the at least one intermediate sync signal.

21. The apparatus of claim 19, wherein a flag for a last sync signal from among the at least one intermediate sync signal is set to a value that is different from that of the flag for the start sync signal.

22. The apparatus of claim 18, wherein a value of a pattern of the start sync signal is different from that of the at least one intermediate sync signal.

23. The apparatus of claim 22, wherein, if the at least one intermediate sync signal comprises at plurality of intermediate sync signals, respective patterns of the plurality of intermediate sync signals have different values.

24. The apparatus of claim 18, wherein the MUX inserts information that indicates a length of the transport packet into the transport packet.

25. The apparatus of claim 24, wherein the information that indicates the length of the transport packet comprises one of a packet length field that indicates the transport packet length and a sync number field that indicates a number of sync signals included in the transport packet.

26. A receiving-end apparatus in a communication system, the apparatus comprising:
    a De-multiplexer (DEMUX) for obtaining a synchronization of a transport packet of variable-length by detecting a start sync signal comprised in a header of the transport packet and at least one intermediate sync signal arranged in the transport packet according to a pre-defined interval between sync signals and for extracting a stream from the transport packet; and
    a decoder for processing the stream.

27. The apparatus of claim 26, wherein the DEMUX identifies the start sync signal by using a flag for the start sync signal and at least one flag for the at least one intermediate sync signal.

28. The apparatus of claim 27, wherein the flag for the start sync signal is set to a value that is different from that of the at least one flag for the at least one intermediate sync signal.

29. The apparatus of claim 28, wherein a flag for a last sync signal from among the at least one intermediate sync signal is set to a value that is different from that of the flag for the start sync signal.

30. The apparatus of claim 26, wherein the DEMUX identifies the start sync signal by using a pattern of each of the start sync signal and the at least one intermediate sync signal.

31. The apparatus of claim 30, wherein the pattern of the start sync signal is set to a value that is different from that of the pattern of the at least one intermediate sync signal.

32. The apparatus of claim 31, wherein, if the at least one intermediate sync signal comprises a plurality of intermediate sync signals, respective patterns of the plurality of intermediate sync signals have different values.

33. The apparatus of claim 26, wherein the DEMUX determines a start point of a next transport packet by using information that indicates a length of the transport packet.

34. The apparatus of claim 33, wherein the information that indicates the length of the transport packet comprises one of a packet length field that indicates the transport packet length and a sync number field that indicates a number of sync signals included in the transport packet.

* * * * *